(12) United States Patent
Kusama et al.

(10) Patent No.: US 8,699,760 B2
(45) Date of Patent: Apr. 15, 2014

(54) IMAGE PROCESSING APPARATUS, IMAGE PROCESSING METHOD, AND PROGRAM

(75) Inventors: Kiyoshi Kusama, Tokyo (JP); Naoki Matsuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 664 days.

(21) Appl. No.: 12/550,058

(22) Filed: Aug. 28, 2009

(65) Prior Publication Data
US 2010/0067749 A1    Mar. 18, 2010

(30) Foreign Application Priority Data

Sep. 16, 2008  (JP) ................ 2008-237183
Sep. 16, 2008  (JP) ................ 2008-237184

(51) Int. Cl.
*G06K 9/00*    (2006.01)

(52) U.S. Cl.
USPC ........................................................ 382/118

(58) Field of Classification Search
USPC ........................................................ 382/275
See application file for complete search history.

(56) References Cited

U.S. PATENT DOCUMENTS

| | | | |
|---|---|---|---|
| 5,905,530 A | 5/1999 | Yokota et al. | |
| 6,538,691 B1 * | 3/2003 | Macy et al. | 348/222.1 |
| 2001/0005222 A1 * | 6/2001 | Yamaguchi | 348/223 |
| 2008/0123970 A1 * | 5/2008 | Ozaki et al. | 382/232 |
| 2009/0059096 A1 * | 3/2009 | Yamamoto et al. | 348/746 |
| 2009/0060394 A1 * | 3/2009 | Yamazaki et al. | 382/311 |
| 2009/0135269 A1 * | 5/2009 | Nozaki et al. | 348/222.1 |

FOREIGN PATENT DOCUMENTS

| | | |
|---|---|---|
| JP | 06-165024 | 6/1994 |
| JP | 11-331543 A | 11/1999 |
| JP | 2000-004352 A | 1/2000 |
| JP | 2005-318401 A | 11/2005 |
| JP | 2007-129587 | 5/2007 |
| JP | 2008-104101 A | 5/2008 |
| WO | WO 2007060980 A1 * | 5/2007 |

OTHER PUBLICATIONS

Aug. 31, 2012 Japanese Office Action, which is enclosed without an English Translation, that issued in Japanese Patent Application No. 2008-237184.

May 18, 2012 Japanese Office Action, which is enclosed without English Translation, that issued in Japanese Patent Application No. 2008-237183.

* cited by examiner

*Primary Examiner* — Atiba O Fitzpatrick
*Assistant Examiner* — Thomas A James
(74) *Attorney, Agent, or Firm* — Cowan, Liebowitz & Latman, P.C.

(57) ABSTRACT

An image processing apparatus comprises an image processing unit configured to execute image processing which involves a change in a boundary shape of image data; a face detection unit configured to detect a face region included in the image data; a setting unit configured to set a parameter of the image processing; and a determination unit configured to determine whether or not to execute the image processing or whether or not to output a warning in accordance with the parameter of the image processing set by the setting unit and a position of the face region detected by the face detection unit.

10 Claims, 9 Drawing Sheets

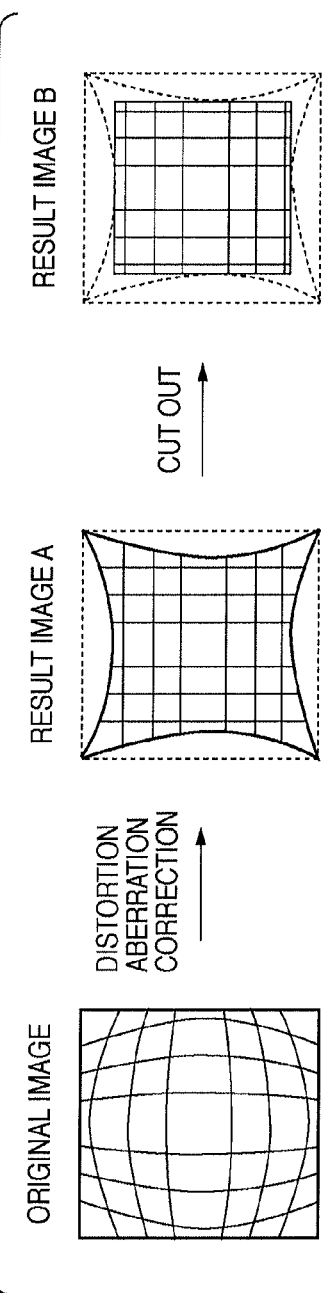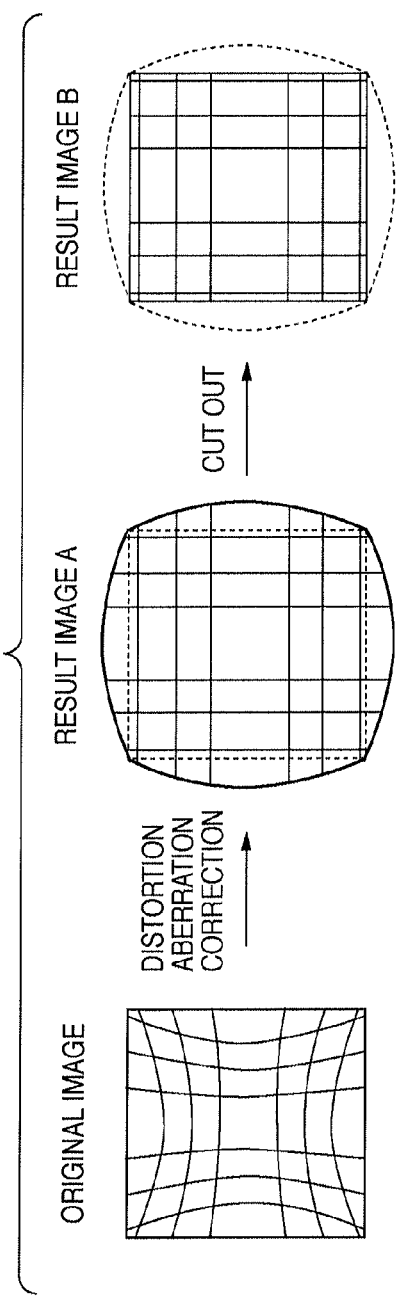

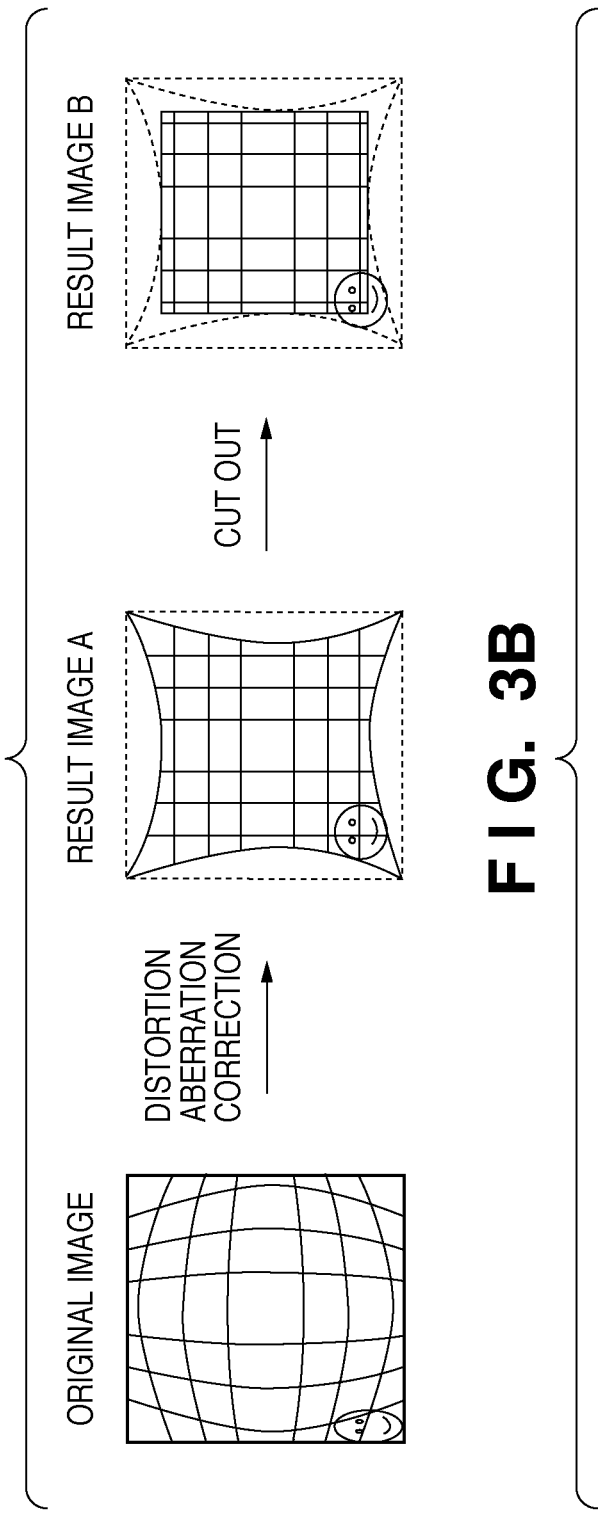
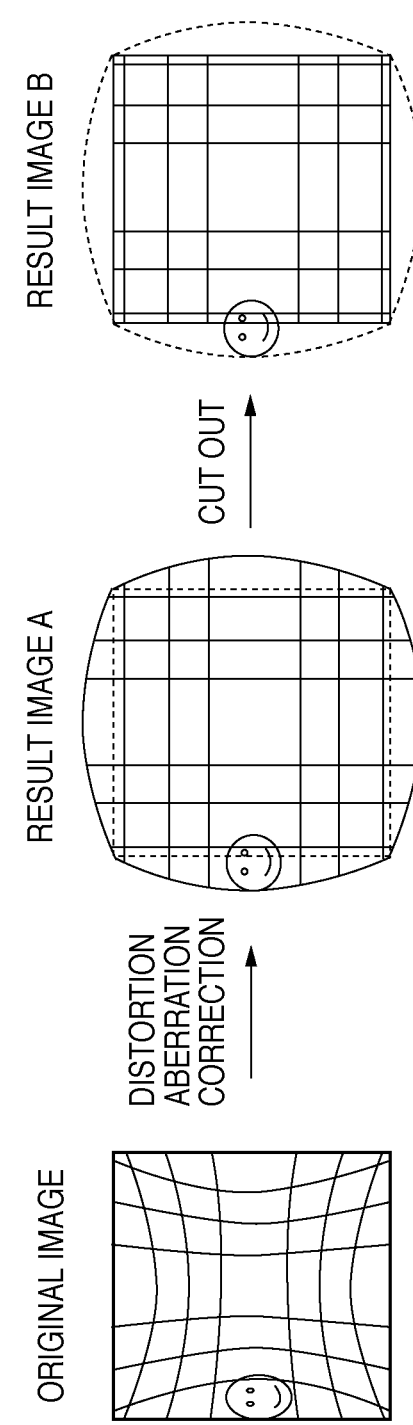

FIG. 5

```
START
  ↓
READ IMAGE DATA — S501
  ↓
PERFORM FACE DETECTION ON IMAGE DATA — S502
  ↓
SET DISTORTION ABERRATION CORRECTION PARAMETER — S503
  ↓
S504: FACE PORTION IN BEFORE-CORRECTION IMAGE MISSING IN AFTER-CORRECTION IMAGE?
  NO → S505: EXECUTE DISTORTION ABERRATION CORRECTION
  YES → S506: NOT EXECUTE DISTORTION ABERRATION CORRECTION
  ↓
END
```

FIG. 6

| FACE ID | STARTING POINT | SIZE   |
|---------|----------------|--------|
| 0       | X0, Y0         | W0, H0 |
| 1       | X1, Y1         | W1, H1 |
| 2       | X2, Y2         | W1, H2 |
| 3       | X3, Y3         | W3, H3 |

IMAGE PROCESSING APPARATUS, IMAGE PROCESSING METHOD, AND PROGRAM

BACKGROUND OF THE INVENTION

1. Field of the Invention

The present invention relates to an image processing apparatus of digital image data and an image processing method thereof.

2. Description of the Related Art

Recently, due to improved performance of digital cameras, resolution of photographed images has become extremely high and it has become possible to obtain high-quality photograph images which are in no way inferior to photographs taken by silver-salt film cameras. Photographed images can be viewed or edited by using an image processing application program installed in a personal computer or the like.

In general, geometric distortion is generated in an image photographed by a camera because of lens distortion aberration. In order to correct the aberration, an image processing application program is available to correct aberration by utilizing the information at the time of taking the photograph, for example, the photograph lens. By executing such distortion aberration correction processing, more homogeneous and higher-quality images can be obtained.

FIG. 2A shows distortion aberration correction processing performed in a case of correcting an image having barrel distortion. FIG. 2B shows distortion aberration correction processing in a case of correcting an image having pincushion distortion.

Since distortion aberration correction processing involves migration of pixel positions, the boundary shape of an image also changes. Meanwhile, a boundary shape of an image is generally rectangular. Therefore, it is a general procedure that, after the distortion aberration correction processing is performed, the image is trimmed to a maximum-size rectangle or trimmed at an aspect ratio of the camera which has taken the photograph, and the image in the circumferential region is cut out to create a rectangle-shaped image (e.g., refer to Japanese Patent Laid-Open No. 2007-129587).

However, when a photograph including a person's face in the circumferential region is subjected to distortion aberration correction and then trimmed, the geometric distortion of the lens is properly corrected, but part of the object's face is sometimes missing or the entire face of the object is sometimes cut out. For instance, in a case where there is an object's face at the edge portion of the screen, the trimming may cause a partial missing of the face (see FIGS. 3A and 3B).

SUMMARY OF THE INVENTION

The present invention has been proposed in view of the above-described problem, and realizes an image processing technique which prevents a missing of object's face portion in an image or prevents such incident of not being able to perform face detection in the course of executing distortion aberration correction processing.

In order to solve the aforementioned problem, the present invention provides an image processing apparatus comprising: an image processing unit configured to execute image processing which involves a change in a boundary shape of image data; a face detection unit configured to detect a face region included in the image data; a setting unit configured to set a parameter of the image processing; and a determination unit configured to determine whether or not to execute the image processing or whether or not to output a warning in accordance with the parameter of the image processing set by the setting unit and a position of the face region detected by the face detection unit.

The present invention also provides an image processing method comprising the steps of: executing image processing which involves a change in a boundary shape of image data: detecting a face region included in the image data; setting a parameter of the image processing; and determining whether or not to execute the image processing or whether or not to output a warning in accordance with the parameter of the image processing set in the setting step and a position of the face region detected in the detecting step.

The present invention also provides an image processing apparatus comprising: an image processing unit configured to execute image processing which involves a change in a boundary shape of image data; a face detection unit configured to detect a face region included in the image data; a comparing unit configured to make comparison of a face detection result in regard to the image data before and after the image processing is performed; and a changing unit configured to change a parameter of the image processing in accordance with a comparison result of the comparing unit.

The present invention also provides an image processing method comprising the steps of: executing image processing which involves a change in a boundary shape of image data; detecting a face region included in the image data; comparing a face detection result in regard to the image data before and after the image processing is performed; and changing a parameter of the image processing in accordance with a comparison result of the comparing step.

According to the present invention, it is possible to prevent a missing of object's face portion in an image or prevent such incident of not being able to perform face detection in the course of executing distortion aberration correction processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are explanatory views of distortion aberration correction processing;

FIGS. 3A and 3B are explanatory views of problems caused by distortion aberration correction processing;

FIG. 5 is a flowchart describing determination processing of a distortion aberration correction result according to the first embodiment;

FIG. 6 shows, as an example, a face detection information table according to the embodiment;

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

First Embodiment

Figure 1:
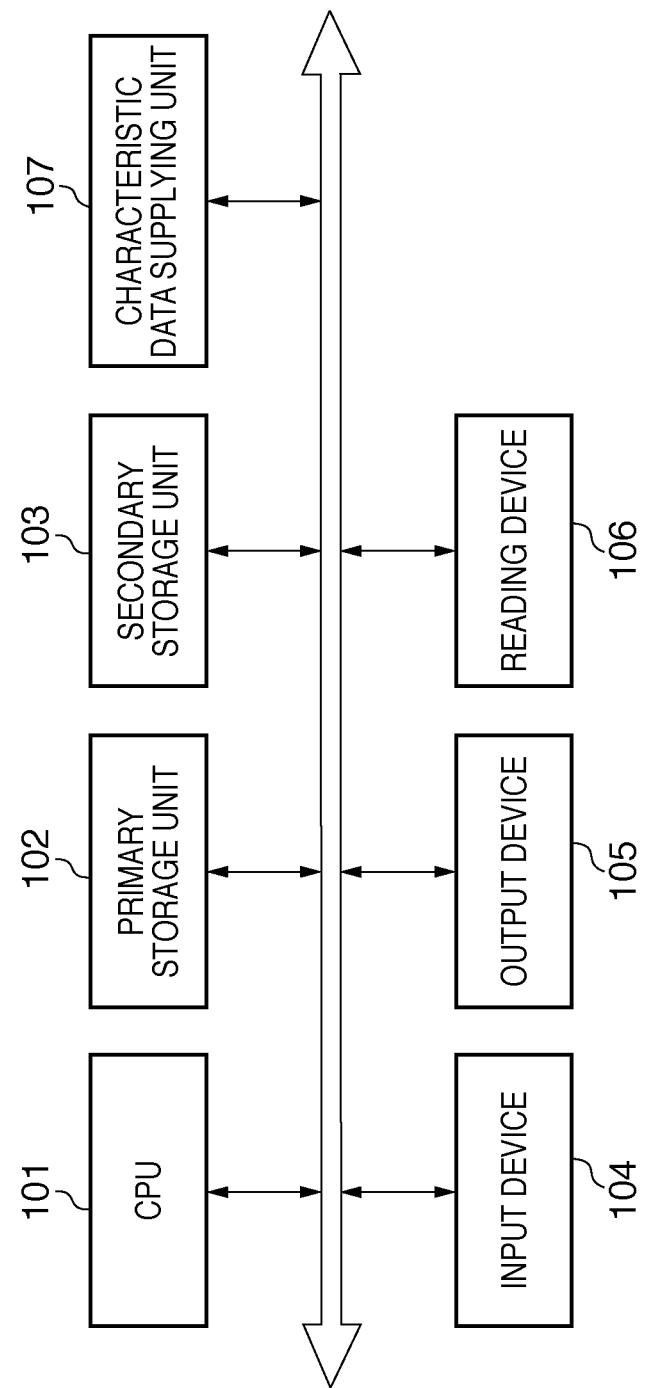
FIG. 1 is a block diagram showing a configuration of an image processing apparatus according to an embodiment of the present invention.

FIG. 1 is a block diagram showing a configuration of an image processing apparatus according to an embodiment of the present invention.

In FIG. 1, a CPU 101 performs overall control of the entire system operation, and executes a program or the like stored in a primary storage unit 102.

The primary storage unit 102 is mainly a memory, which reads and stores a program which has been stored in a secondary storage unit 103.

The secondary storage unit 103 is, for instance, a hard disk. Since the primary storage unit 102 has a smaller capacity than that of the secondary storage unit 103, programs and data that cannot be stored in the primary storage unit 102 are stored in the secondary storage unit 103. Also, data which need to be stored for a long period of time are stored in the secondary storage unit 103. The program for realizing the procedure according to the present embodiment is stored in the secondary storage unit 103, read out to the primary storage unit 102 at the time of program execution, and executed by the CPU 101.

An input device 104 includes, for instance, a mouse and a keyboard for receiving user operation. It is used for sending an interruption signal to the program or the like.

An output device 105 includes, for instance, a monitor serving as a display device, and a printer.

A reading device 106 performs writing/reading image data, which has been generated by an image sensing element such as a CCD, in/from the primary storage unit 102 or the secondary storage unit 103 directly or indirectly.

A characteristic data supplying unit 107 comprises a memory (not shown). This memory holds lens characteristic information corresponding to various lenses, more specifically, a correction coefficient corresponding to a photographic lens. In the distortion aberration correction processing which will be described later, a correction function is set in advance, and the correction coefficient read from the characteristic data supplying unit 107 is applied to the correction function. As a result, a correction value is calculated and the image is modified in accordance with the correction value. The distortion aberration correction is the image processing which involves distortion in the boundary shape of the image. Note that the lens characteristic information can be obtained by referring not only the memory of the characteristic data supplying unit 107 but the secondary storage unit 103 or an external storage unit (not shown).

Figure 4:
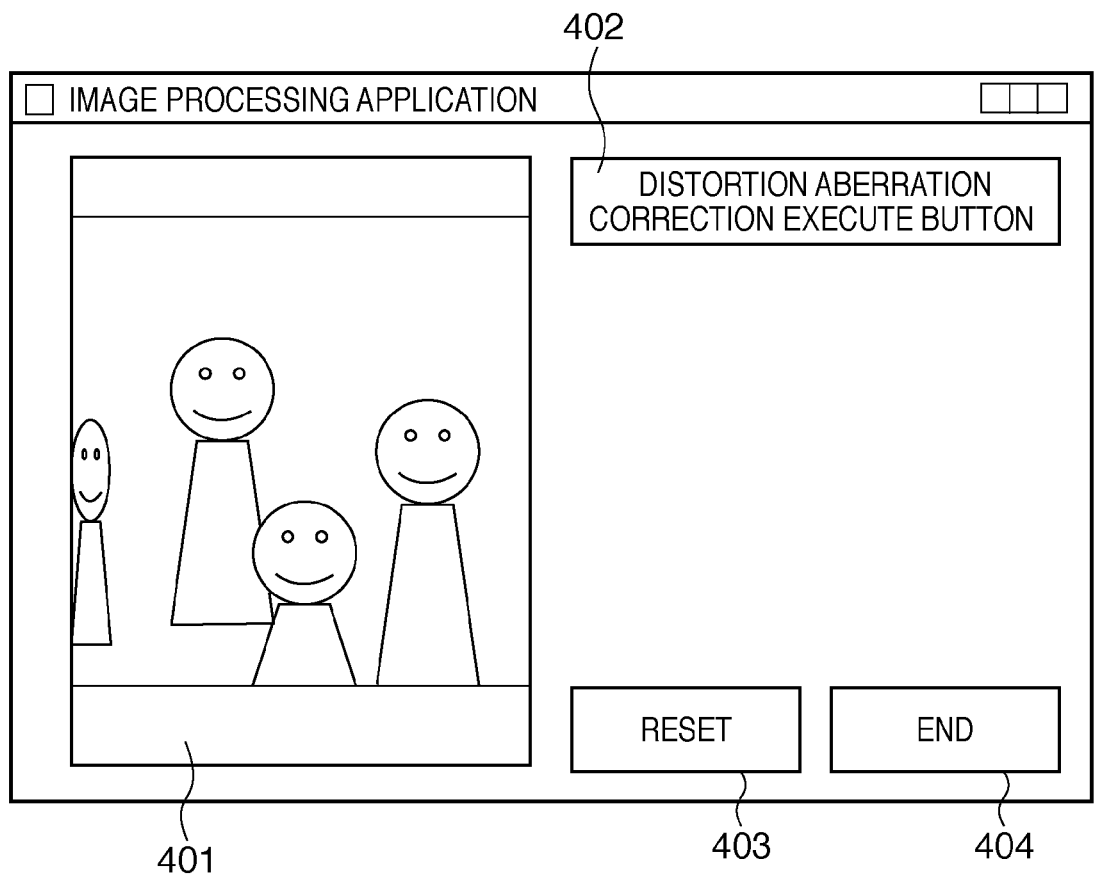
FIG. 4 shows, as an example, a user interface of an image processing application program according to the embodiment.

FIG. 4 shows, as an example, a user interface (GUI) of the image processing apparatus according to the present embodiment (hereinafter referred to as the image processing application).

Referring to FIG. 4, in the image display window 401, a processing-target image is displayed in a fit-to-view mode (the processing-target image is enlarged to the maximum size within a range that the entire region of the target image is displayed in the window). The processing-target image is designated by, for example, dragging and dropping the file into the image display window 401 from the file management system of an operating system. It is also possible to display a result image after certain image processing is performed on the processing-target image.

When a distortion aberration correction execute button (hereinafter referred to as the execute button) 402 is depressed, distortion aberration correction processing is executed, and the corrected image is displayed on the image display window 401. When distortion aberration correction processing is executed, there is a case that the boundary shape of the corrected image is not rectangular. In this case, a rectangular region of the result image, which internally touches the boundary of the result image may be cut out, and the cut-out image may be set as a result image (see FIGS. 2A and 2B).

When a reset button 403 is depressed, the image on which the distortion aberration correction processing has not been performed is displayed on the image display window 401.

To end the image processing application, an end button 404 is depressed.

The processing performed when the execute button 402 is depressed is now described with reference to the flowchart in FIG. 5.

In step S501, the CPU 101 first reads out image data and displays the image in the image display window 401.

In step S502, the CPU 101 executes face detection on the read-out image data, and records the detected information. The recorded information herein includes the number of detected faces, and the position and size of each face. For instance, assuming a case where four faces are detected, four face IDs shown in the table in FIG. 6 are recorded as face detection information.

For a face detection method, various techniques are publicly known. For instance, there is a method which employs learning, represented by a neural network. Furthermore, there is a method of identifying characteristic parts of the physical shape, for example, eyes, nose, mouth, and face line, in the image information using template matching. In addition, there is a technique of detecting a characteristic value of image information, for example, skin color, a shape of eyes or the like, and employing statistical analysis. Still further, there is a technique for determining whether or not the face is near the position where a face region is previously detected, or a technique for determining the neighboring color of the face region in order to take the color of the clothes into consideration, or a technique for setting a lower face identification threshold value as the detection area nears the center of the screen.

In step S503, the CPU 101 sets a distortion aberration correction parameter (hereinafter referred to as a correction parameter).

The distortion aberration correction processing according to the present embodiment is performed by a well-known method, for example, a method disclosed in Japanese Patent Laid-Open No. 6-165024. More specifically, characteristic data is obtained from the characteristic data supplying unit 107 using the optical information at the time of taking a photograph, and the characteristic data is applied to the predetermined correction function for determining a correction value regarding an image height (a distance from the center of the image). In the present embodiment, a correction function is a cubic function using the image height as a parameter.

To perform distortion aberration correction processing, it is necessary to obtain identification information for identifying the lens, focus distance information at the time of taking the photograph for specifying the zoom position, and optical information at the time of taking the photograph such as an F-stop value. In this embodiment, these pieces of information are stored in MakerNote tags defined by the Exif. To further improve the correction precision, other information such as object distance information may be used in addition to the aforementioned information.

In step S504, the CPU 101 determines whether or not the face portion in the image, which has been detected before the correction is performed, will be missing in the image after the correction.

A determination method of whether or not a face portion will be missing is now described with reference to FIGS. 7 and 8.

As described in FIGS. 2A and 2B, since distortion aberration correction processing involves migration of pixel positions, the boundary shape of an image also changes. Meanwhile, a boundary shape of an image is generally rectangular. Therefore, after the distortion aberration correction processing is performed, the image is trimmed to a maximum-size rectangle, or trimmed at an aspect ratio of the camera which has taken the photograph, and the image in the circumferential region is cut out.

Figure 7:
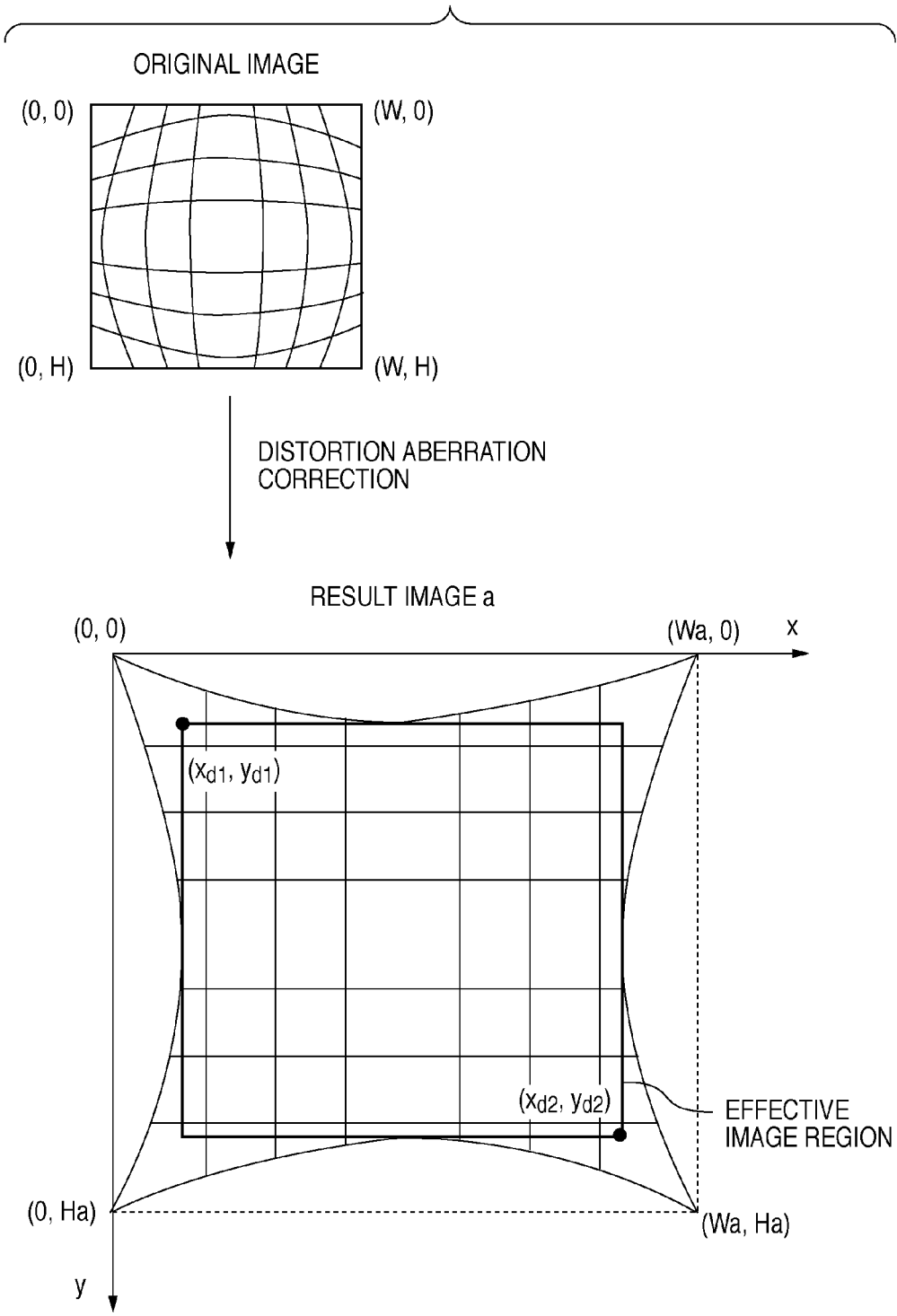
FIG. 7 is an explanatory view of distortion aberration correction processing according to the first embodiment.
Figure 8:
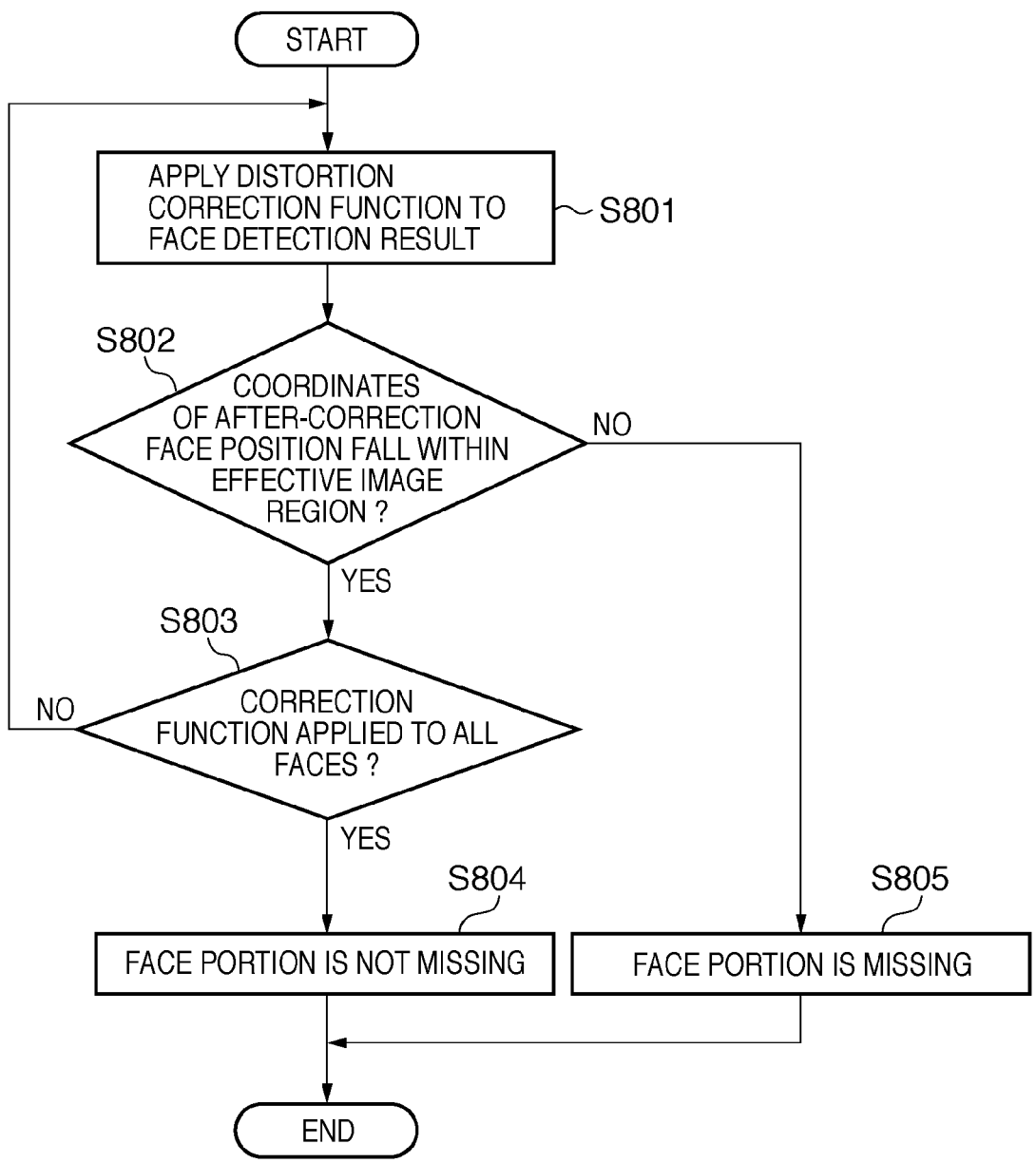
FIG. 8 is a flowchart describing determination processing of a distortion aberration correction result according to the first embodiment.

More specifically, by performing the distortion aberration correction processing on an image having a width W and a height H as shown in the original image in FIG. 7, the correction result image a is obtained. As a result, the corrected image has a width Wa and a height Ha, and the new correction result image is a rectangle surrounded by the starting point (xd1, yd1) and the ending point (xd2, yd2). Hereinafter, the rectangular region will be referred to as an effective image region.

Although the effective image region according to the present embodiment is a maximum-size rectangle, the effective image region may be the region which is trimmed at the same aspect ratio as that of the camera which has taken the photograph, or a region later trimmed by a user.

Hereinafter, the determination processing of whether or not a face portion will be missing is described with reference to the flowchart in FIG. 8.

In step S801, the CPU 101 applies the distortion aberration correction function to the face detection data, thereby acquiring coordinates of the after-correction face position.

In step S802, if the coordinates of the after-correction face position fall within the effective image region, the control proceeds to step S803. If even part of the coordinates of the after-correction face position fall outside the effective image region, the control proceeds to step S805 where the CPU 101 decides that the distortion aberration correction processing causes the missing of the face portion.

In step S803, processing from step S801 is repeated until the correction function is applied to all faces. When the correction function is applied to all faces, the control proceeds to step S804 where the CPU 101 decides that the distortion aberration correction processing does not cause the missing of the face portion.

By the above-described processing, it is possible to determine in step S504 whether or not the face portion will be missing.

If it is determined that the face portion will not be missing, the control proceeds to step S505 where the CPU 101 executes the distortion aberration correction processing.

If it is determined that the face portion will be missing, the control proceeds to step S506 where the CPU 101 does not execute the distortion aberration correction processing.

The image processing application executes the steps shown in FIG. 5 when the execute button 402 is depressed. When it is determined that the face portion will be missing, a message such as "the object's face portion will be missing" is displayed in a dialogue box for warning the user, and the control ends. Alternatively, a message such as "the object's face portion will be missing. Would you like to end the processing?" is displayed in a dialogue box to confirm the user's intention to execute distortion aberration correction processing. The processing may be executed only when the user still wants to execute the distortion aberration correction processing. Moreover, in a case where it is determined that the face portion will be missing, the correction parameter may be changed so as to reduce the reflection level of the distortion aberration correction processing in step S503, and then the processing based on the flowchart in FIG. 8 may be executed again.

Furthermore, although the present embodiment provides distortion aberration correction processing by way of example, the present invention is also effective in cutting out an effective image region from an image which has been rotated a predetermined angle.

As has been described above, in a case where distortion aberration correction processing causes a missing of an object's face portion in the effective image region, the distortion aberration correction processing is not performed. As a result, it is possible to prevent the object's face from being cut out.

Furthermore, in the present embodiment, it is possible to determine, before the distortion aberration correction processing is performed, whether or not a face portion will be missing with respect to the entire pixels of an image. Therefore, the determination can be made quickly.

Note, in the present embodiment, although the CPU 101 obtains coordinates of the after-correction face position by applying a distortion aberration correction function and determines whether or not the coordinates fall within the effective image region, the determination method is not limited to this. Once a distortion aberration correction parameter is set, an effective image region of the corrected image can uniquely be obtained. Therefore, coordinates of the region, which is to become an effective pixel region after distortion aberration correction is performed, in the before-correction image may be stored in a table in association with the distortion aberration correction table. Once such table is stored, the CPU 101 only needs to obtain a face position detected from the before-correction image and a distortion aberration correction parameter, and it is possible to determine, before the distortion aberration correction is performed, whether or not distortion aberration correction processing will cause the missing of the object's face portion in the effective image region.

Second Embodiment

In the first embodiment, determination is made as to whether or not a face position in an image falls outside the effective image region after distortion aberration correction processing is performed on the image, and based on the result of the determination, whether or not to perform distortion aberration correction is determined. However, in reality, there is a case that face detection is possible even if part of the face is missing. In view of this, the present embodiment provides processing for determining whether or not face detection is possible and setting a correction parameter.

The present embodiment can be realized by the apparatus configuration shown in FIG. 1 and the GUI shown in FIG. 4.

Figure 9:
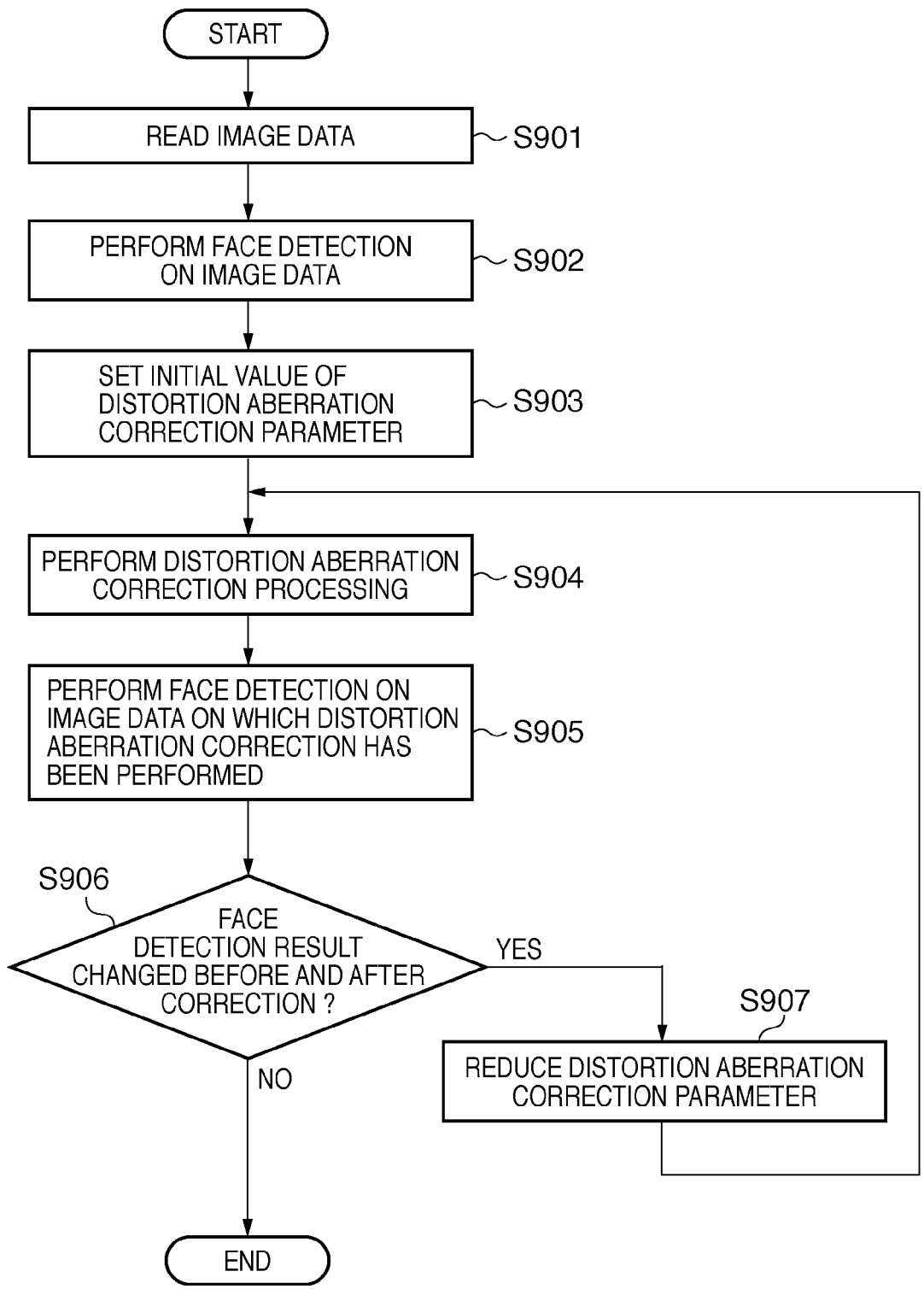
FIG. 9 is a flowchart describing determination processing of a face detection result according to the second embodiment.

FIG. 9 is a flowchart describing the processing performed when the execute button 402 is depressed on the image processing apparatus according to the second embodiment.

In step S901, the CPU 101 displays an image on the reading-image display window 401.

In step S902, the CPU 101 executes face detection on the read image data, and records information such as that shown in FIG. 6.

Here, the starting point and size of each face ID, and a face region of each face ID are defined.

In step S903, the CPU 101 sets an initial value of the correction parameter.

The distortion aberration correction processing according to the present embodiment is also executed according to the method disclosed in Japanese Patent Laid-Open No. 6-165024.

Identification information for identifying the lens, focus distance information at the time of taking a photograph for specifying the zoom position, and optical information at the time of taking a photograph such as a F-stop value, which are necessary to perform lens aberration correction processing, are stored in MakerNote tags defined by the Exif.

An initial value of the correction parameter is set by the aforementioned method.

In step S904, the CPU 101 performs the distortion aberration correction processing on the entire original image data.

In step S905, the CPU 101 performs face detection on the image, on which distortion aberration correction processing has been performed. For the after-correction detection result, the starting point and size of each face ID are recorded in the table shown in FIG. 6. The table is held separately from the table which has been generated before the correction is performed.

In step S906, the CPU 101 compares the before-correction face detection result with the after-correction face detection result. As a result of the comparison, if the before-correction face detection result is within a predetermined threshold value when compared with the after-correction face detection result, it means that the face detection result does not change largely before and after the correction. Therefore, it is determined that the distortion aberration correction processing using the current correction parameter will not cause the missing of the face portion, and then the control ends.

Figure 10:
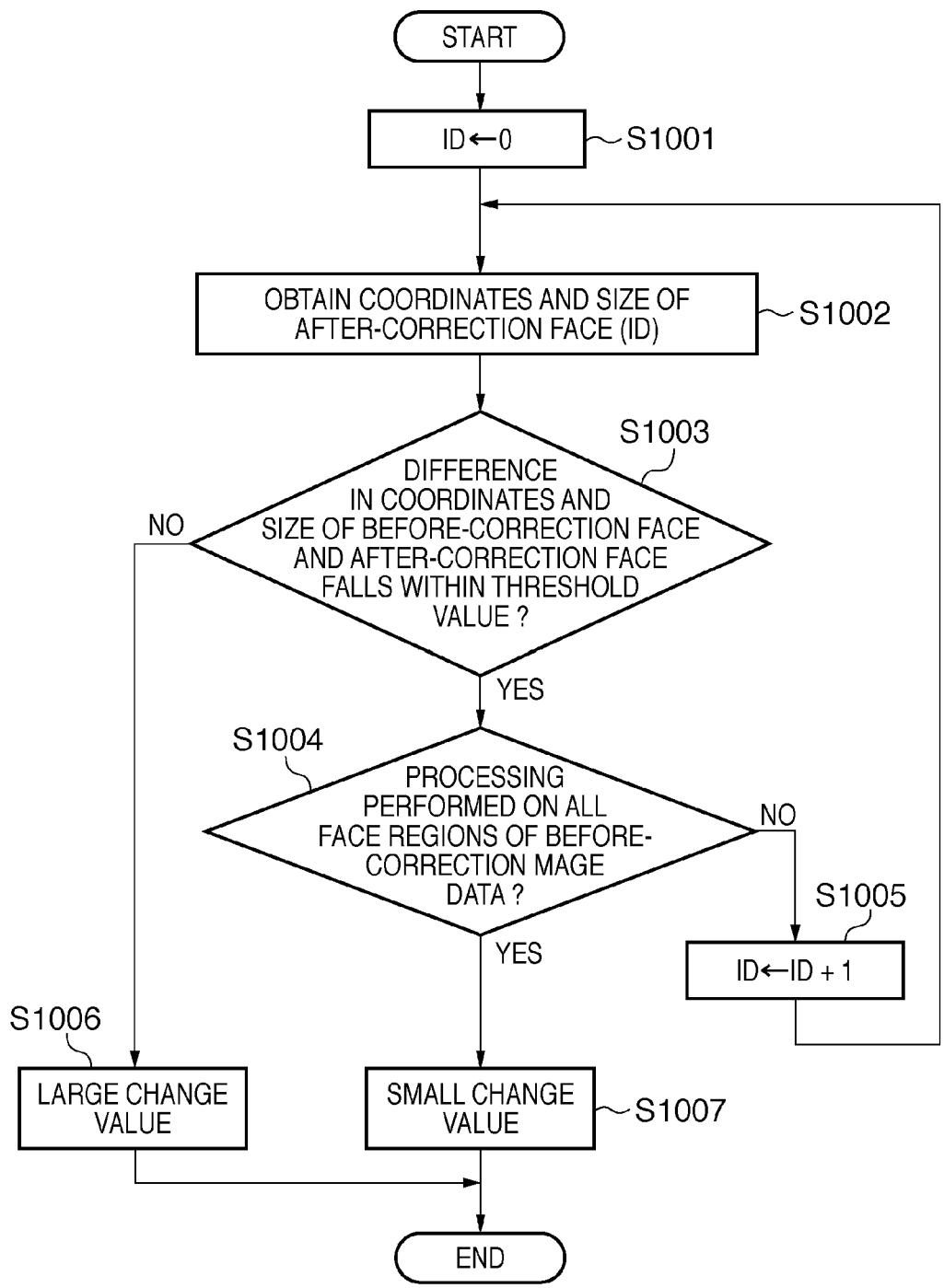
FIG. 10 is a flowchart describing determination processing of a face detection result according to the second embodiment.

Hereinafter, the face detection result determination method in step S906 is described with reference to the flowchart in FIG. 10.

In step S1001, the CPU 101 inputs 0 in the face ID for initializing.

In step S1002, with respect to coordinates of the face (ID), the CPU 101 obtains coordinates of the after-correction face ID, using the aforementioned correction parameter. The coordinates obtained herein are with respect to the starting point and size of the face ID.

In step S1003, the CPU 101 retrieves whether or not the face region, which has been obtained in step S902, exists within a threshold value of the starting point and size of the after-correction face ID, which have been obtained in step S1002.

Herein set as a threshold value is an area which is horizontally and vertically 30% larger than the size of the after-correction face ID, which has been obtained in step S1002.

As a result of the retrieval in step S1003, if the face region obtained in step S902 does not exist, the CPU 101 determines that the change value is large, and the control proceeds to step S1006.

If the face region exists, the control proceeds to step S1004. Then, if correction is performed on all the before-correction face IDs, the control proceeds to step S1007. If not, the control proceeds to step S1005 where the ID is incremented by 1 and the control returns to step S1002.

When the change value is large in step S1006, the face detection result will largely change. Therefore, the control proceeds to step S907.

In step S907, the CPU 101 changes the parameter in a way that the correction parameter is reduced by 10%, and thereafter the distortion aberration correction processing is performed again in step S904.

Note that the retrieval range of the before-correction and after-correction face detection results is set horizontally and vertically 30% larger than the size of the face ID in step S1003. This retrieval range is set because, should the retrieval range is set larger, other faces may be included in the retrieval result. However, depending on the number of faces, the retrieval range may be enlarged.

Furthermore, the correction parameter is reduced uniformly by 10% in step S907. This is because of the fact that the change value of the face detection result varies depending on the type of lens. In order not to bother considering the variation in lenses, 10% is set.

For another method, a table for the types of lens and correction parameters may be referred to change the reduction rate of the correction parameter in accordance with a variation of a change value.

Note, although the present embodiment employs the entire image data in face detection processing, in order to speed up the processing, thinned-out image data may be employed.

According to the above-described embodiment, a correction parameter can be set in a way that the face detection result does not largely change before and after the distortion aberration correction processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-237183 and 2008-237184, filed Sep. 16, 2008, which are hereby incorporated by reference herein in their entirety.

What is claimed is:

1. An image processing apparatus comprising:
an image processing unit configured to execute correction of distortion aberration of image data;
a face detection unit configured to detect a face region included in the image data; and
a comparing unit configured to compare a first position of the face region before the correction of distortion aberration is executed and a second position of the face region after the correction distortion aberration is executed to determine whether a difference between the first position and the second position is larger than a predetermined threshold value,
wherein in case where the difference between the first and second positions is larger than the predetermined threshold value, said image processing unit ends the correction of distortion aberration and/or outputs a warning.

2. The image processing apparatus according to claim 1, wherein the predetermined threshold value is set based on a size of the face region after correction distortion aberration is executed.

3. The image processing apparatus according to claim 1, further comprising:
an image sensing unit configured to sense an object and generate image data; and
a display unit configured to display the image data sensed by said image sensing unit.

4. An image processing method comprising the steps of:
executing correction of distortion aberration of image data;
detecting a face region included in the image data; and
comparing a first position of the face region before the correction of distortion aberration is executed and a second position of the face region after the correction distortion aberration is executed to determine whether a difference between the first position and the second position is larger than a predetermined threshold value,
wherein in case where the difference between the first and second positions is larger than the predetermined value, the correction of distortion aberration is ended and/or a warning is output.

5. The image processing method according to claim 4, wherein the predetermined value is set based on a size of the face region after the correction of distortion aberration is executed.

6. An image processing apparatus comprising:
an image processing unit configured to execute correction of distortion aberration of image data;
a face detection unit configured to detect a face region included in the image data; and
a comparing unit configured to compare a first position of the face region before the correction of distortion aberration is executed and a second position of the face region after the correction distortion aberration is executed to determine whether a difference between the first position and the second position is larger than a predetermined threshold value,
wherein in case where the difference between the first and second positions is larger than the predetermined value, said image processing unit changes a parameter of the correction of distortion aberration in a way that the parameter is reduced.

7. The image processing apparatus according to claim 6, further comprising:
an image sensing unit configured to sense an object and generate image data; and
a display unit configured to display the image data sensed by said image sensing unit.

8. An image processing method comprising the steps of:
executing correction of distortion aberration of image data;
detecting a face region included in the image data; and
comparing a first position of the face region before the correction of distortion aberration is executed and a second position of the face region after the correction distortion aberration is executed to determine whether a difference between the first position and the second position is larger than a predetermined threshold value,
wherein in case where the difference between the first and second positions is larger than the predetermined value, a parameter of the correction of distortion aberration is changed in a way that the parameter is reduced.

9. A non-transitory computer readable medium storing a program which causes a computer to execute the image processing method defined in claim 4.

10. A non-transitory computer readable medium storing a program which causes a computer to execute the image processing method defined in claim 8.

* * * * *